(No Model.)

J. H. B. RANKIN.
TIDAL MOTOR.

No. 421,761. Patented Feb. 18, 1890.

WITNESSES:
A. J. Mosher
E. E. Hamill

INVENTOR:
James H. B. Rankin
By C. B. Tuttle
Att'y

UNITED STATES PATENT OFFICE.

JAMES H. B. RANKIN, OF BOSTON, MASSACHUSETTS.

TIDAL MOTOR.

SPECIFICATION forming part of Letters Patent No. 421,761, dated February 18, 1890.

Application filed March 30, 1889. Renewed January 24, 1890. Serial No. 337,934. (No model.)

*To all whom it may concern:*

Be it known that I, JAMES H. B. RANKIN, of Boston, county of Suffolk, and Commonwealth of Massachusetts, have invented certain Improvements in Tidal Motors, of which the following, taken in connection with the accompanying drawings, is a specification.

This invention relates to an apparatus for obtaining motive power from the rise and fall of the tide-water. It has for its object to utilize and convert into motive power the lifting force of the tide and the downward force of gravity alternately.

The invention consists, broadly, in a float, a mechanism located, preferably, on said float, and connections between said mechanism and the stationary structure in proximity to said float, whereby the movement of the float rising and falling with the tide is imparted to and made to operate said mechanism.

The invention consists, further, in certain matters of construction, the details of which are hereinafter fully set forth, and then specifically pointed out in the claims.

Figure 1:
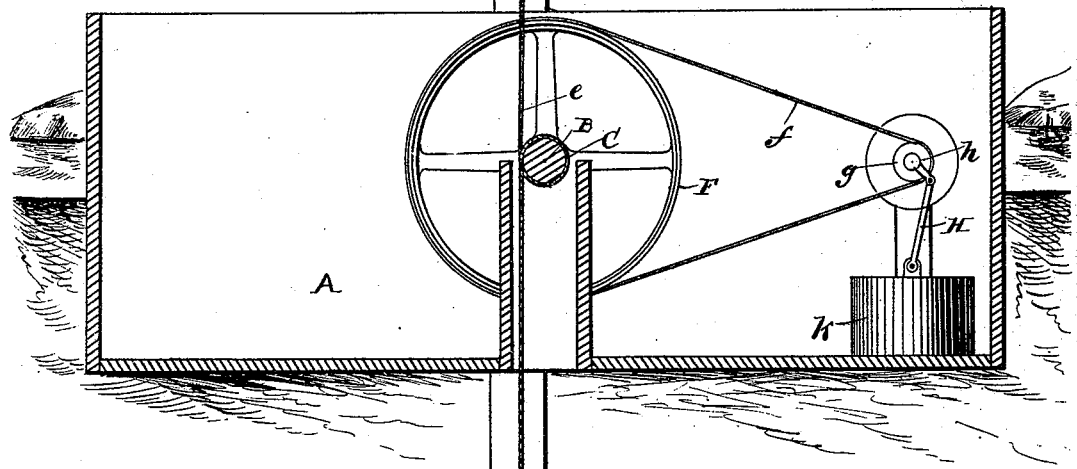
Figure 2:
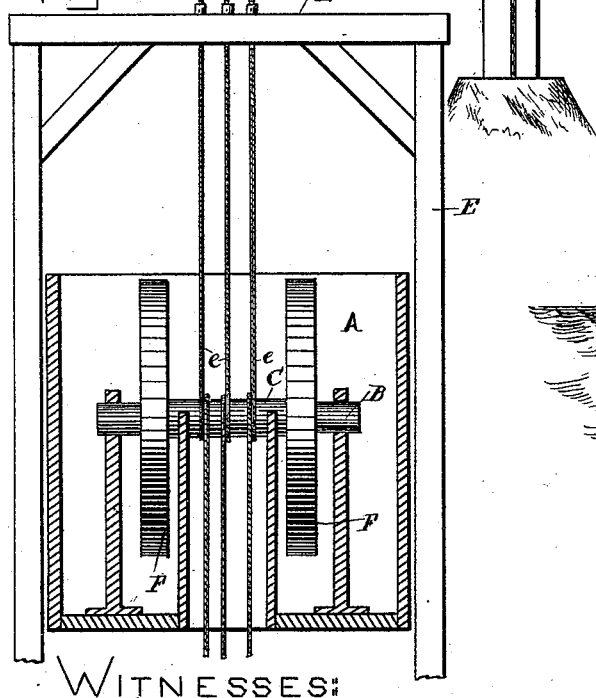
Figure 3:
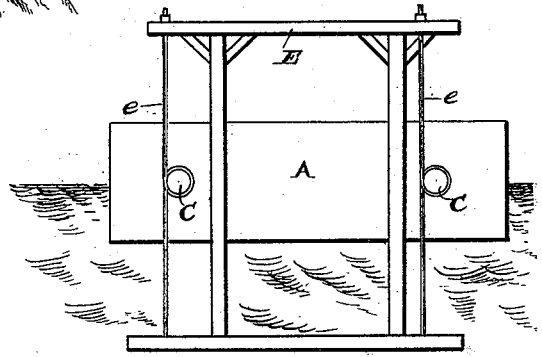

In the accompanying drawings, Figure 1 is a longitudinal section of a tidal motor embodying this invention; Fig. 2, a transverse section thereof. Fig. 3 represents a modified form of my invention.

The apparatus comprises a float A, which may be of any suitable shape and material and of sufficient area in horizontal section to displace such an amount of water as will produce the required buoyant force.

The machinery to be actuated by the converted buoyant force derived from the tide in lifting and the force of gravity in depressing the float is preferably located directly upon the float itself, and, as shown in this instance, it comprises a main shaft B, journaled in suitable bearings and provided with or constituting in itself a large drum C. Coiled about the drum are cables e, which are made fast in frame-work E. Said frame-work is securely anchored or otherwise made stationary to the land, and is of sufficient stability to withstand the upward and downward pressure that is brought upon the cables as the float rises and descends. As the upward and downward movement of the float is very slow, it is necessary to apply great force at the point of engagement between the float and the stationary frame-work, in order to permit the use of a desirable speed-increasing mechanism. It is to this end that I employ the cables e as a means of connection between the stationary frame-work and the rising and falling float. Said cables are wound about the shaft or drum C, supported on the float, and have their ends secured or anchored in the stationary frame-work, to the end that the drum rising and falling with the float is made to revolve by means of the cables, which remain stationary with the frame-work, as described.

In another application, Serial No. 286,771, filed September 9, 1888, I have shown and described a tidal motor comprising a float that supports the machinery to be actuated by the rising and falling of the float, in which the means employed for a connection between the float and the stationary frame-work comprises a shaft journaled on the float and provided at its ends with gears that mesh with racks on the stationary frame-work at the sides of the float; and I do not in the present application claim such specific arrangements of shafting, except as it comes in the scope of the invention hereinafter broadly claimed.

From the foregoing construction it will be understood that the shaft B is caused to rotate by action of the cables during the rise and fall of the float; but as the float moves with a slow movement a speed-increasing mechanism is made use of whenever desirable to obtain a rapid speed at the delivery-point. The power may be transmitted from the shaft B by means of any suitable transmitting mechanism. As shown in this instance, the shaft B is provided with one or more large pulleys F, which also serve as a fly-wheel, and are connected by a belt f with a pulley g, which, as shown in Fig. 1, operates a crank-shaft h, connected by a pitman H with the piston of an air-compressing cylinder k, that may be employed, if desired, to compress air into a reservoir supported either on the float itself or at any convenient point, and connected with the compressing-engine by a suitable conduit having a flexible portion to accommodate the rise and fall of the float.

As shown in Figs. 1 and 2, the winding drum and cables are located near the center of the float, which is provided with a well, through which the cables pass; but obviously the arrangement may be such as to comprise a series of cables with shafts and stationary frame-work located at different points relatively to the float, and in the construction shown in Fig. 3 the float is provided with two shafts, which extend to the outside of the float and are there provided with drums to engage two sets of cables. Such construction insures the guidance of the float and insures equalization of the force acting on said shafts, as was effected by the rack-and-pinion construction forming the subject of my former application hereinbefore referred to, wherein said mechanism is specifically claimed. The present invention is not, however, limited to any specific form of machinery supported on the float and actuated by the upward and downward movement thereof, nor of the adjacent and connecting mechanism by which the said upward and downward movement is converted into a more rapid rotary or reciprocating movement. Obviously, instead of the cables wound about the drum, as shown, a chain belt may be employed, the links whereof engage projections on the surface of the drum.

I claim as of my invention—

1. In combination, the rising and falling float, a power-transmitting device carried thereby, a stationary structure, and an operating connection immovably secured to the stationary structure against vertical movement and engaging at a point intermediate of its ends with the power-transmitting device, substantially as described.

2. In combination, the float, the shaft and power-transmitting mechanism carried thereby, the stationary structure, and a flexible connection, as a rope or chain, having its ends immovably fixed to the stationary structure and its intermediate portion passing around the shaft or drum, substantially as described.

JAMES H. B. RANKIN.

Witnesses:
E. E. HAMILL,
C. B. TUTTLE.